Figure 1:
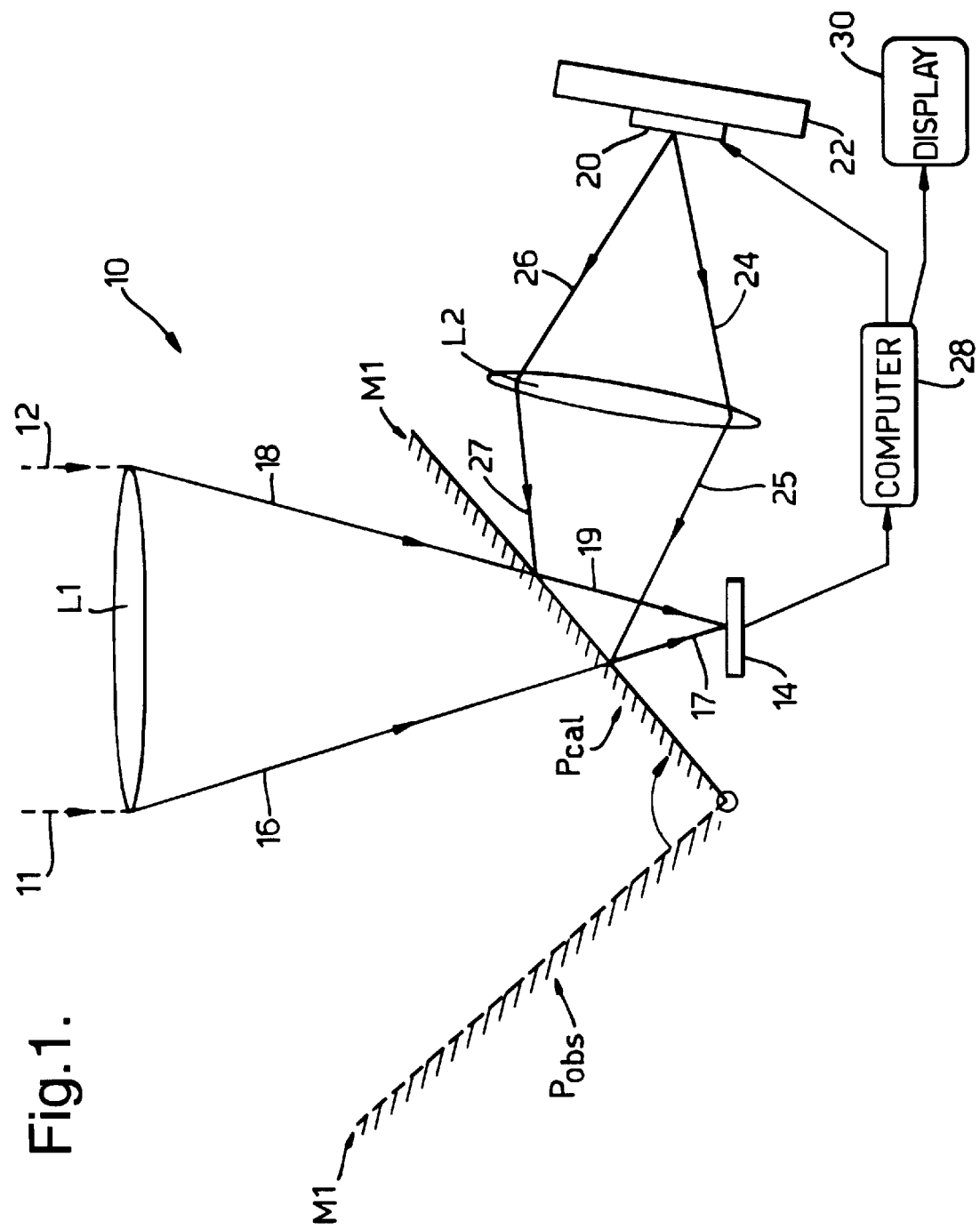

United States Patent [19]
Ashley et al.

[11] Patent Number: 6,127,679
[45] Date of Patent: Oct. 3, 2000

[54] THERMAL SENSING SYSTEM HAVING A FAST RESPONSE CALIBRATION DEVICE

[75] Inventors: Timothy Ashley; Charles T Elliott; Neil T Gordon; Ralph S Hall, all of Malvern, United Kingdom

[73] Assignee: The Secretary of State for Defence in Her Britannic Majesty's Government of the United Kingdom of Great Britain and Northern Ireland, Farnborough, United Kingdom

[21] Appl. No.: 08/983,349

[22] PCT Filed: Jul. 29, 1996

[86] PCT No.: PCT/GB96/01805

§ 371 Date: Jan. 9, 1998

§ 102(e) Date: Jan. 9, 1998

[87] PCT Pub. No.: WO97/05742

PCT Pub. Date: Feb. 13, 1997

[30] Foreign Application Priority Data

Jul. 31, 1995 [GB] United Kingdom .................. 9515682

[51] Int. Cl.[7] .................................................. G01D 18/00
[52] U.S. Cl. .......................................................... 250/252.1
[58] Field of Search ............................................ 250/252.1

[56] References Cited

U.S. PATENT DOCUMENTS

| | | |
|---|---|---|
| 4,789,788 | 12/1988 | Cox . |
| 4,948,964 | 8/1990 | Gohlke . |
| 5,023,459 | 6/1991 | Osborn et al. . |
| 5,302,824 | 4/1994 | Prager . |
| 5,343,040 | 8/1994 | Wiese et al. .......................... 250/252.1 |
| 5,354,987 | 10/1994 | MacPherson . |
| 5,420,421 | 5/1995 | Lindgren et al. ..................... 250/252.1 |
| 5,820,261 | 10/1998 | Yam ............................................ 374/2 |

FOREIGN PATENT DOCUMENTS 0 601 534  6/1994  European Pat. Off. .

OTHER PUBLICATIONS

Bolgov et al., "IR Sources with Barrier–Free Injection Mechanism", Optoelectronics, Instrumentation and Data Processing, No. 4, 1989, pp. 92–95.

Dmitriev et al., "Dynamic Infrared Scene Simulators", Journal of Optical Technology, vol. 61, No. 10, Oct. 1994, pp. 711–719.

*Primary Examiner*—Constantine Hannaher
*Attorney, Agent, or Firm*—Nixon & Vanderhye P.C.

[57] ABSTRACT

A thermal sensing system (10) including an array of photon detectors (14) produces a detector-dependent response to irradiation. Variations in individual detector characteristics produce a fixed pattern noise which degrades an image or other response. A switchable mirror (M1) may at one position ($P_{cal}$) direct infrared radiation from a light emitting diode (20) onto the detector array (14). The diode (20) is both a negative and positive luminescent emitter, the flux emitted is current controlled to be equivalent to black body radiation at a range of temperatures both colder and hotter than ambient. Calibration relationships comprising transfer functions relating incident intensity to signal response are derived for each detector. Alternatively the mirror (M1) may be at an observation position ($P_{obs}$) and infrared radiation from a remote scene reaches the detector array (14). Resulting detector signals are converted into corrected fluxes using individual calibration relationships previously derived and an image or response with reduced fixed pattern noise is obtained.

21 Claims, 1 Drawing Sheet

THERMAL SENSING SYSTEM HAVING A FAST RESPONSE CALIBRATION DEVICE

BACKGROUND OF THE INVENTION

1. Field of the Invention

This invention relates to a thermal sensing system and more particularly to both imaging and non-imaging sensing systems incorporating an array of photon-detecting elements.

2. Discussion of Prior Art

Thermal imaging systems are known in the prior art. Such imaging systems can involve either series or parallel processing. In the former case a scene is scanned and each component of the scene is focused sequentially onto a detector. These systems are not easy to design however if compactness is important: the scanning mechanism renders the adaptation to lightweight imagers extremely difficult. An alternative arrangement for area imaging is to employ many detectors to sample simultaneously distinct sections of the scene. A major disadvantage of this system is that the transfer function from incident infrared flux to output signal (detector signal) is particularly sensitive to variation between detecting elements. This results in an image degraded by fixed pattern noise arising from sources both within and independent of the detecting elements. Imperfections in the optical system (e.g. vignetting) and variations in the associated electronic circuits are examples of the latter case. Photodetector sources can be static variations in characteristics (e.g. area, quantum efficiency or cut-off wavelength) or dynamic instabilities (temperature, offset voltage and slope resistance all drift over a period of time) which give rise to the need for regular array recalibration. Additionally 1/f noise introduces an error which increases with the period between calibrations. Compensation for inter-detector variations is particularly important in "staring" applications which measure the absolute radiation intensity within a scene. Scanning imagers measure only changes in intensity across a scene. The output from a staring array is thus of poor contrast in comparison.

Non-imaging thermal detectors are also known in the prior art. They have applications in areas such as robotics and missile guidance systems for which human interpretation of detector output is not required. The actual detecting elements are similar to those described above in relation to imaging systems. In non-imaging systems however an object (robot or missile) is arranged to respond to a particular signal appearing on the detectors. This recognition feature may vary in its complexity. For example, pattern recognition can be linked to a number of response options or a less complex reflex can result in steering towards the achievement of a characteristic detector response. Staring arrays are particularly suitable in satisfying the lightweight requirements of missile systems. However in such missiles the detector system is subject to rapid temperature change as the missile cone heats up during flight. Frequent recalibration is necessary in order to maintain an acceptable accuracy.

An imaging system incorporating a detector array is disclosed by P. N. J. Dennis et al. in Proc. SPIE 572 22 (1985). The authors describe a two dimensional close packed array of cadmium mercury telluride detectors interfaced to a silicon charge coupled device (CCD). Infrared light incident on a detector elicits a response signal which is injected into the CCD and integrated over a period of time (the stare time). The subsequent signal processing system addresses the fundamental problems of poor contrast from the infrared scene and nonuniformity of detector element responses. The nonuniformity correction is made by exposing the array to two uniform scenes of different temperature with an arrangement of mirrors used to introduce them into the optical path. From measurements of stimulus infrared flux and detector response a correction factor is derived for each individual detector by forcing a uniform scene to give rise to a uniform image. The signal response is fitted linearly to incident radiation intensity and an offset and gradient derived to describe the transfer function for each detector in the array. All values of signal response at all detectors can thus be converted into corrected incident flux values. Array calibration in this way is performed periodically (perhaps hourly or daily) and the updated correction factors applied to subsequent measurements. This compensates for 1/f noise and detector parameters drifting over a period of time as a result of, for example, temperature changes.

A disadvantage of such sensing systems is that possible reference temperature sources limit the performance in terms of speed and compactness. If physically separate reference scenes are used then the sensor requires an optical system with considerable complexity and bulk. Alternatively reference temperatures could be supplied by a Peltier cooled/heated reference plane but the finite time taken to adjust to temperature leads to a lengthy calibration process.

A combination of both these techniques is disclosed in U.S. Pat. No. 4,419,692. This patent is concerned with a multi-detector scanning thermal imager which already possesses a bulky scanning mechanism and so no particular advantage is gained by physical reduction of the reference system. Scanning thermal imagers are frequently used with an array of detector elements in order to increase sensitivity. Uniformity corrections then have to be incorporated into the signal processing. In this device errors are reduced over the thermal range present in the scene under observation by allowing one of three thermo-electric references to be varied by the operator to provide a reference level at the midpoint of the scene thermal range. The Peltier cooler used to provide this third reference is varied between scenes in order to adapt the calibration technique to the characteristics of each particular scene. Three reference temperatures are used as opposed to two in the Dennis system above: one provides a dc level about which the ac temperature variations detected by the scanning imager are referenced and the remaining two provide the uniformity correction for the detector array.

Another correction mechanism, again used with a scanning thermal imager, is described in UK patent 2 225 914 A. A single reference source is used which removes the requirement for additional optical components to bring different sources into the optical path. A disc coated to provide regions of differing reflectivity is rotated between this single reference source and the thermal imager. The differing reflectivities permit different proportions of the radiation emitted from the source to be passed to the imager. Thus different effective temperatures can be used as references. The mechanical spinning of the disc is synchronised with the scanning mechanism to arrange for the reference temperatures to be passed to the thermal imager only during inactive periods of the scan. However this technique still requires mechanical movement mechanisms for both the disc spinning and scene scanning. Overall, this imager is still bulky and unsuitable for some applications. Furthermore there is a limit to the number of differing-reflectivity sections which can be incorporated on the disc. Each level of flux must be viewed for sufficient time to allow the imager to adjust to the new reading and the majority of the disc must be uncoated to correspond to the time needed to view the scene.

SUMMARY OF THE INVENTION

It is an object of the invention to provide an alternative form of thermal sensing system.

The present invention provides a thermal sensing system including an array of photon-detecting elements and switching means for interchanging between scene observation and detector calibration modes of the system characterised in that the system also includes a variable luminescence device arranged to provide array illumination for calibration purposes, the variable luminescence device having flux emission which is variable to within 10% of a steady state value in a settling time of less than ten seconds.

The invention provides the advantage that it can be constructed in compact form and is capable of providing a means for fast, frequent and accurate correction for nonuniformity of detector elements.

The variable luminescence device is preferably electrically controllable and capable of readjusting the intensity of flux emission to within 1% of a steady state value in a settling time of less than one second. Operation within the specified limits may be provided for if the variable luminescence device is a semiconducting device which in a preferred embodiment is an infrared light emitting diode (IR LED) which is electrically biasable to provide both positive and negative infrared luminescence emission. P. Berdahl et al. in Infrared Phys. 29(2–4) 667 (1989) explain positive luminescence as an increase in the radiation emitted from a body when its situation of thermal equilibrium is perturbed by some exciting mechanism. Similarly negative luminescence is a decrease in emitted radiation relative to equilibrium thermal emission. The IR LED ideally has a predetermined relationship between emission intensity and biasing strength. This provides capability for rapid calibration. In this embodiment the system lends itself to providing a more accurate uniformity correction than is possible on a similar timescale in prior art thermal sensors. One disadvantage of prior art thermal sensors is that detector nonuniformity is not linear over the temperature range of interest and making a nonlinear correction requires at least three reference scenes to emit radiation onto the detector. The fast settling speed of IR LEDs provides for a series of different intensity reference fluxes to be used in the uniformity correction and so the calibration function relating individual detector signal response to incident flux can be fitted to a polynomial expansion which does not assume linearity.

Furthermore, an IR LED with these characteristics is capable of providing a reference temperature which is optionally above or below ambient temperature. It can cover a greater temperature range than the commonly used Peltier cooler. Practically, a Peltier cooler is run in reverse to reach temperatures above ambient and the range covered is only a few tens of degrees. An IR LED is capable of simulating temperatures across a range far in excess of that of the Peltier cooler/heater.

These advantages are apparent in both scanning and staring thermal sensors which use an array of detector elements and this invention should not be seen as restricted to either. However, the advantages are more significant when the IR LED is used to provide the uniformity correction for a staring array. A staring thermal sensor already admits of compact construction and greater accuracy is important to enhance the low contrast generally achievable. Improving contrast without significantly increasing the size is an advance which extends the utility of both staring thermal imagers and similar non-imaging sensors.

The switching means is preferably arranged for the detector array to receive radiation from the variable luminescence device between intervals of scene observation. In one embodiment the switching means is switchable between a first configuration in which radiation from a scene under observation is incident on the detector and a second configuration in which radiation from a variable luminescence device is incident on the detector. This provides the advantage that the time for which the detector array is idle is reduced to the time taken to switch between these two configurations only. Prior art imagers with n physically separate reference scenes require a switching means which provides for n+1 different configurations.

The thermal sensing system of the invention may include a computer arranged to derive a corrective function for each detector in the array from the detector output response to the variable luminescence device and in accordance therewith to correct the detector output response to an observed scene. This provides the advantage of fast calculation which allows the thermal sensing system of the invention to incorporate any practical detector array. More specifically the computer may be arranged to calculate the relationship between the intensity of infrared radiation ($F_1$) incident on a detector of the array and magnitude of electrical signal response ($s_{in}$) therefrom when the source of the radiation is the variable luminescence device arranged to provide infrared flux at a predetermined intensity. The computer is then also arranged to apply the derived relationship as a correction to signals output from that detector in the course of scene observation. The variable luminescence device may be arranged to emit radiation with at least three different predetermined intensities for array calibration purposes, and the computer is then arranged to calibrate each detector in the array by fitting the predetermined radiation intensities to detector signal responses as a power series expansion of at least quadratic order. In this way the advantage of accurate (nonlinear) correction factors over a range of incident flux intensities described previously can be combined with the advantage of fast calculation also described above.

The computer is preferably arranged to use the derived relationships between incident flux and detector response and thereby to apply a uniformity correction to the array signal responses. In imaging systems the computer is also arranged to pass the corrected signals to a means for display arranged to indicate strength of signal from each individual detector at a position in the image corresponding to that in the detector array.

The computer is also preferably arranged to update the derived relationship between incident flux and each single detector signal response at intervals and to apply the updated relationships to subsequent observations. This provides the advantage of reduction in the effect of detector drift over a period of time. In this embodiment the computer may be arranged to update the derived relationship between incident flux and each single detector response more frequently than once per hour. The drift associated with the 1/f noise alone can half the sensitivity of a high performance 2D detector array in less than one hour. The updating frequency may be adaptive to the observed scene. It can be chosen as appropriate in that detector properties change with scene temperature rendering a previous uniformity correction inaccurate. Resolution will therefore be lost in proportion with the rate of mean temperature change within the scene and frequent updating will be necessary in order to resolve small temperature differences. In prior art imagers the settling time required by Peltier coolers prohibits such frequent checks and severe distortions can result with a high temperature scene. In a non-imaging missile homing system the errors introduced by the rapid variation in ambient temperature as the missile is launched can be countered by frequent recalibration of the detector array in accordance with this invention. Prior art homing systems provide for frequent recalibration by a rapid switching between separate cold and hot reference scenes. Such a switching mechanism however is costly in terms of minimising system size. A single-source IR LED facilitates frequent recalibration without the need for such a switching mechanism.

The IR LED may be arranged to emit reference fluxes which cover a similar intensity range to that of the radiation emanating from a scene under observation. This provides for the uniformity correction to be derived from reference radiation characteristic of an observed scene. This enables error correction to be most effective in the region of the temperatures actually being measured. The dynamic range of the IR LED makes an imager incorporating such a reference source capable of effective imaging of a wide variety of environments.

In a further embodiment the computer may be arranged to control the current through the IR LED in response to detector output signals. The current may be controlled in the first instance in response to uncorrected signals and subsequently to corrected values of incident flux intensity. This provides the advantage that calibration fluxes are automatically controlled to be characteristic of an observed scene. Prior art sensors do not have this flexibility and reference temperature scenes may not bear any relation to a scene under observation and the calibration is therefore inaccurate. This advantage is particularly relevant when small differences from background are important.

In particular, the variable luminescence device may be a light emitting diode of cadmium mercury telluride or an indium antimonide based material such as InAlSb. InGaSb.

In a further aspect the present invention provides a method of applying, a uniformity correction to a thermal sensing system including an array of photon-detecting elements, the method comprising the steps of:

(a) irradiating the detector array with infrared radiation from a variable luminescence device whose luminescence is adjustable to within 10% of a selected value with an adjustment time of less than ten seconds, the variable luminescence device also having predetermined flux output characteristics.

(b) deriving correction factors for each detector in the array from the output responses to predetermined fluxes, and (c) applying the correction factors to output signals from the array detectors arising when infrared radiation from an observed scene is incident on the detector array.

The invention provides the advantage that a uniformity correction can be calculated and applied with an accuracy and speed appropriate to the requirements of the situation in which the thermal sensing system operates.

Steps (a) and (b) may be repeated at intervals in order to update the correction factors derived in Step (b) and thus there is the additional advantage that the uniformity correction can be updated with a frequency appropriate to the system's operating requirements.

Array irradiation in Step (a) may be performed with at least three different predetermined flux intensities output from the variable luminescence device and the correction factors of Step (b) derived by fitting the incident radiation intensities to a power series expansion to at least quadratic terms of detector signal response. This provides the advantage of dealing with nonlinearity in the detector response to incident flux across the range of radiation intensities which may emanate from the observation scene.

In order that the invention might be more fully understood, embodiments thereof will now be described with reference to the accompanying drawing in which:

The FIGURE illustrates schematically a proposed mode of operation for performing a uniformity correction using a negative/positive luminescent device.

DETAILED DISCUSSION OF PREFERRED EMBODIMENTS

With reference to the FIGURE, there is shown a thermal sensing system in an imaging implementation indicated generally by 10. The system 10 incorporates an objective lens L1 which focuses infrared (IR) radiation, indicated by rays 11, 12, emanating from an observed scene (not shown) onto a two-dimensional array of microdetectors 14. A two-position mirror M1 is in either an observation position $P_{obs}$ (indicated by a dashed line) or a calibration position $P_{cal}$ (bold line). When the mirror M1 is in position $P_{obs}$ then the path of the radiation focused by the lens L1 corresponds to the region between the rays 16, 17 and 18, 19. An indium antimonide light emitting diode (LED) 20 is mounted on a Peltier cooler/heater device 22. A lens L2 passes IR radiation emitted by the LED 20 to the detector array 14 via reflection from the mirror M1 in its position $P_{cal}$. The path followed by this radiation beam is contained within the rays 24, 25, 17 and 26, 27, 19. A computer 28 processes information received from the detector array 14, passes information to a display apparatus 30 and controls current input to the LED 20.

When exposed to an IR flux the detector array 14 responds with a corresponding array of electronic signals $s_n$, $1 \leq n \leq N$, where $s_s$ is the signal from the nth detector in the array and N is the total number of detectors in the array.

In a situation of radiative equilibrium the IR LED 20 will be emitting as much radiation into its surroundings as it absorbs from them. However this equilibrium situation is disturbed by the application of an electric current. In such a situation the IR LED 20 will either be a net emitter (positively luminescent) or a net absorber (negatively luminescent) of IR radiation. The mode of operation depends on whether the LED is forward or reverse biased. The intensity of IR radiation emitted (or absorbed) is dependent on the strength of current flowing. The IR LED 20 is calibrated so that for any particular value of current flowing and any sense of biasing the intensity of IR radiation emitted or absorbed by the IR LED is known. The Peltier device 22 serves to hold the temperature of the IR LED stable at the temperature at which its IR emission was calibrated. In this way the IR LED 20 acts as a calibrated variable-intensity source or sink for IR radiation. This IR flux can equivalently be regarded as that emanating from, or absorbed by, a body at a particular (nonequilibrium) temperature T. It is not strictly necessary to use a Peltier device 22 to stabilise the temperature of the IR LED. All that is required is that the IR flux is maintained at a level appropriate to the temperature simulation required. In an alternative embodiment this is done by implementing an electronic feedback mechanism which adjusts the current through the IR LED in response to a direct measurement of the LED temperature.

The detector array 14 receives radiation from the IR LED 20 when the mirror M1 is in position $P_{cal}$. With this arrangement a known IR flux emitted by the LED 20 is passed by the lens L2 and reflected by the mirror M1 at $P_{cal}$ to the detector array 14. The known flux emitted from the IR LED 20, say $F_1$, is assumed to then be incident on each detector of the array 14. To correct for nonuniformity across the array the signal. $s_{In}$, from the nth detector is interpreted as the response to $F_1$. The relationship between incident flux and signal response from the nth detector is fitted to a polynomial:

$$F_1 = a_n + b_n s_{In} + c_n s_{In}^2 + d_n s_{In}^3 + \ldots \quad (1)$$

where the constants $a_n$, $b_n$, $c_n$, $d_n$, etc. are specific to the nth detector of the array only.

The current through the IR LED 20 is adjusted to a variety of strengths in forward and reverse biasing directions. This provides for further reference fluxes, $F_2$, $F_3$, $F_4$, etc. to be directed onto the detector array. The time in which the IR LED stabilises at a new flux value is less than a second, a response which compares very favourably with alternative methods of variable flux provision e.g. a cooled/heated reference plane for which temperature control (equivalently, flux control) is provided by a Peltier cooler/heater. If the total number of reference observations is given by $i_{max}$ then a set of simultaneous equations in the form of Equation (1) can be derived for the nth detector:

$$F_i + a_n + b_n s_{In} + c_n s_{In}^2 + d_n s_{In}^3 + \ldots \quad i=1,2,3,\ldots i_{max} \quad (2)$$

The accuracy with which the relationship between IR flux F and signal s can be deduced for each detector depends on the number of reference observations made i.e. the polynomial can only be solved as far as the $(i_{max}-1)$th power of s.

Similar sets of simultaneous equations are derived and solved for each of the N detectors in the array with the aid of a computer. The analogue detector signals are first converted into a digital representation and a computer is used to set up and solve the N series of $i_{max}$ equations. The N sets of values $a_n$, $b_n$, $c_n$, $d_n$, etc. are then stored in the computer memory for later use in applying the uniformity correction.

During normal operation of the thermal imaging system 10 in observing a scene, the mirror M1 is pivoted to position $P_{obs}$. Radiation from the scene is then focused onto the detector array 14 and the output electronic signal from each detector in the array is recorded. This yields N signals which are then converted into N uniformity-corrected IR flux values using the $a_n$, $b_n$, $c_n$, $d_n$, etc. coefficients from Equation (2) to perform the calculation shown in Equation (3)

$$F_n^{obs} = a_n + b_n s_n^{obs} + c_n (s_n^{obs})^2 + d_n (s_n^{obs})^3 + \ldots \quad (3)$$

where the superscript obs indicates that the signals are measured while the system is in observation mode and the flux derived is hence the IR flux incident on the nth detector.

To reconstruct the thermal image the IR radiation intensity incident on the nth detector at array position $D_n$ is displaced visually on a display screen at pixel position $P_n$. There is a direct geometric correspondence between the array position $D_n$ and screen position $P_n$ and so features appearing at a particular position in the scene under observation are displaced at the corresponding position in the thermal image. The N values of $F_n^{obs}$ are thus used to construct a thermal image with reduced fixed pattern noise.

The relationship between the signal response of a detector and the incident flux necessary to produce that response can be graphically represented by a curve covering the range of detector operation. The method of obtaining the constants a, b, c, d, . . . outlined above amounts to fixing a few discrete points on this curve (reference fluxes) and fitting these points to a polynomial function in order to interpolate for intermediate values. Thus an approximation to the true curve is derived and used to calculate incident flux ($F_n^{obs}$) from a measured detector signal response ($s_n^{obs}$). Clearly the greater the number of discrete points that are actually measured on this curve then the more accurate are the points derived by interpolation. However these reference measurements are made while the thermal imaging system 10 is in its calibration mode and in this state it cannot be making any measurements in its observation mode. Thus a balance must be found between the desire for accuracy in the calibration Equations (2) and the time needed to take meaningful and accurate observation of the scene of interest.

The system 10 may be employed with periodic updating of the calibration coefficients $a_n$, $b_n$, $c_n$, $d_n$, etc. Observations of the scene are interrupted, the mirror M1 is pivoted to position $P_{cal}$ and calibration measurements are quickly taken. The mirror M1 is then returned to position $P_{obs}$ and the scene measurements continued using the updated values of the coefficients. Updates can in this way be carried out frequently and so reduce inaccuracies arising from drift of detector parameters.

Another refinement of this invention is to choose the calibration fluxes to correspond to those within the real scene. The computer 28 stores the minimum and maximum values of the signals $s_n^{obs}$ registered by array detector in the array 14 while the imaging system 10 is in observation mode. It then controls the current input into the IR LED 20 in order to provide two reference fluxes. One such flux results in a signal response at or near to the maximum value of $s_n^{obs}$ and the other is that which gives rise to the minimum response. Further reference fluxes are then produced from intermediate values of current through the LED 20. After the first calibration the computer converts all the $s_n^{obs}$ to flux values and thus adjusts the IR LED to reproduce the flux intensities incident on the detector array in preference to the signal response. In this way the coefficients $a_n$, $b_n$, $c_n$, $d_n$, . . . are calculated to reproduce (to a close approximation) the actual relationship between incident flux and measured electronic signal over the temperature range of relevance to the observed scene.

While this embodiment of the invention discloses an imaging system it will be appreciated that the invention is equally adapted to incorporation in a non-imaging thermal detection system. In such an embodiment the display 30 is absent and the computer 28 is arranged to drive a response in accordance with the characteristics of the output signals $s_{in}$, $s_n^{obs}$ of the detector array 14.

What is claimed is:

1. A thermal sensing system for observing a scene producing luminance, said system comprising:

a semiconducting device for providing a calibrated known luminance, said calibrated known luminance including negative luminescence;

an array of photon detecting elements;

an at least two position optical system for controllably focusing onto said array of detecting elements luminance from one of said observed scene and said negative luminescence from said semiconducting device;

a switching apparatus for controllably moving said optical system between said at least two positions; and a computer, responsive to the position of said optical system, for calibrating signals from said array of photon detecting elements, resulting from scene observation, with signals resulting from said semiconducting device.

2. A sensing system according to claim 1, wherein the semiconducting device is electrically controllable and capable of readjusting the intensity of flux emission to within 1% of a steady state value in a settling time of less than one second.

3. A sensing system according to claim 1, wherein the switching apparatus is arranged to provide for the array to receive radiation from the semiconducting device between intervals of scene observation.

4. A sensing system according to claim 3, wherein the switching apparatus is switchable between a first configuration ($P_{obs}$) in which radiation from a scene under observation is incident on the array and a second configuration ($P_{cal}$) in which radiation from said semiconducting device is incident on the array.

5. A sensing system according to claim 1, wherein the semiconducting device is an infrared light emitting diode which is electrically biasable to provide both positive and negative infrared luminescence emission and has a predetermined relationship between emission intensity and applied bias magnitude.

6. A sensing system according to claim 1, wherein said computer is arranged to derive a corrective function for each detector element in the array from the detector element output response to the semiconducting device and in accordance therewith to correct the detector element output response to an observed scene.

7. A sensing system according to claim 6 wherein the computer is arranged to calculate the relationship between the intensity of infrared radiation ($F_1$) incident on a detector element of the array and the magnitude of electrical signal response ($s_{in}$) therefrom when the source of the radiation is the semiconducting device arranged to provide infrared flux at a predetermined intensity and subsequent to derivation, the computer is arranged to apply the relationship as a correction to signals output from that detector element in the course of scene observation.

8. A sensing system according to claim 7 wherein the semiconducting device is arranged to emit radiation with at least three different predetermined intensities ($F_1$) for array calibration purposes and the computer is arranged to calibrate each detector element in the array by means of fitting the predetermined radiation intensities ($F_1$) to detector element signal responses ($s_{in}$) as a power series expansion of at least quadratic order.

9. A sensing system according to claim 8 wherein the computer is arranged to use the derived relationships between incident flux ($F_1$) and detector element response ($s_{in}$) and thereby to apply a uniformity correction to the array signal responses ($s_n^{obs}$).

10. A sensing system according to claim 9 wherein the computer is further arranged to pass the corrected signals to a means for display arranged to indicate strength of signal from each individual detector at a position in the image corresponding to that in the detector element array.

11. A sensing system according to claim 8 wherein the computer is arranged to update the derived relationship between incident flux ($F_1$) and each single detector element signal response ($s_{in}$) at intervals and to apply the updated relationships to subsequent observations.

12. A sensing system according to claim 11 wherein the computer is arranged to update the derived relationship between incident flux ($F_1$) and each single detector response ($s_{in}$) at intervals more frequent than once per hour.

13. A sensing system according to claim 1, wherein said semiconducting device is an infrared light emitting diode and is arranged to emit reference fluxes ($F_1$) having a similar intensity range to that of radiation emanating from a scene under observation.

14. A sensing system according to claim 13 wherein the computer is arranged to control current through the diode via a feedback mechanism responsive to said array.

15. A sensing system according to claim 14 wherein said feedback mechanism is initially responsive to a recorded output of said array and subsequently to corrected values of incident flux intensity ($F_n^{obs}$) in order to provide calibration fluxes ($F_1$) which closely match and cover the range of those originating in the observed scene.

16. A sensing system according to claim 1, wherein the semiconducting device is a light emitting diode of cadmium mercury telluride or an indium antimonide based material.

17. A method of applying a uniformity correction to a thermal sensing system including an array of photon-detecting elements, the method comprising the steps of:

(a) irradiating the array with infrared radiation from a semiconducting device whose luminescence includes negative luminescence;

(b) deriving corrections for each detector element in the array from respective output responses ($s_{in}$) to said semiconducting device; and (c) monitoring an observed scene with said system and applying the corrections to output signals from the array.

18. A method according to claim 17 wherein Steps (a) and (b) are repeated at intervals in order to update the corrections applied in Step (c).

19. A method according to claim 17 wherein array irradiation in Step (a) is by at least three different predetermined flux intensities output from the semiconducting device and the correction factors of Step (b) are derived by fitting incident radiation intensities ($F_1$) to a power series expansion of array response to at least quadratic order.

20. A method according to claim 17 wherein the semiconducting device is an infrared light emitting diode which is electrically biasable to provide both positive and negative infrared luminescence.

21. A method according to claim 17 wherein the semiconducting device is a light emitting diode of cadmium mercury telluride or an indium antimonide based material.

* * * * *